United States Patent [19]

Sugio et al.

[11] 4,282,139
[45] Aug. 4, 1981

[54] FIBER-REINFORCED RESIN COMPOSITION CONTAINING POLYPHENYLENE ETHER RESIN

[75] Inventors: Akitoshi Sugio, Ohmiya; Masanobu Masu, Tokyo; Masatugu Matunaga, Matsudo, all of Japan

[73] Assignee: Mitsubishi Gas Chemical Company, Inc., Japan

[21] Appl. No.: 76,950

[22] Filed: Sep. 19, 1979

[30] Foreign Application Priority Data

Sep. 25, 1978 [JP] Japan ................................. 53/117723

[51] Int. Cl.$^3$ .......................... C08K 7/12; C08L 11/04
[52] U.S. Cl. .............................. 260/42.17; 260/42.18; 260/42.43; 260/30.6 R; 260/45.7 P; 525/132
[58] Field of Search ..................... 525/132; 260/42.17, 260/42.43, 30.6 R, 45.7 P

[56] References Cited

U.S. PATENT DOCUMENTS 4,131,598  12/1978  Abolins et al. ....................... 525/132

*Primary Examiner*—Harold D. Anderson
*Assistant Examiner*—Amelia B. Yarbrough
*Attorney, Agent, or Firm*—Wenderoth, Lind & Ponack

[57] ABSTRACT

A fiber-reinforced composition of a polyphenylene ether resin having improved rigidity and dimensional stability, said composition consisting essentially of (a) a polyphenylene ether resin or a mixture of it with a styrene resin, and (b) asbestos fibers.

3 Claims, No Drawings

FIBER-REINFORCED RESIN COMPOSITION CONTAINING POLYPHENYLENE ETHER RESIN

This invention relates to a composition of a polyphenylene ether resin having a reduced mold shrinkage and superior dimensional stability. More specifically, this invention relates to a polyphenylene ether resin composition reinforced with asbestos fibers which has high dimensional stability and high rigidity.

Polyphenylene ether resins are well known as thermoplastic resins having superior physical properties, and are disclosed, for example, in U.S. Pat. Nos. 3,306,874 and 4,011,200. Usually, these resins can be prepared by oxidative polycondensation. A resin composition of a polyphenylene ether resin comprising a styrene resin incorporated therein to improve the moldability of the polyphenylene ether resin is also known (see, for example, U.S. Pat. Nos. 3,383,435 and 4,038,343, and Canadian Application Ser. No. 1,056,091).

As is well known, machines and appliances have tended to be manufactured in lighter weight and on a larger scale in recent years, and plastic materials having high rigidity and good dimensional stability have been required in order to cope with this tendency. As a result, plastic materials reinforced with glass fibers have, for example, been developed. Polyphenylene ether resins or resin compositions thereof have also been suggested and actually provided as molding materials containing glass fibers as a reinforcing material.

U.S. Pat. Nos. 3,960,985, 4,002,701, 4,038,343, 4,097,550 and 4,113,797 teach that asbestos can be incorporated as a reinforcing filler in a resin composition comprising a polyphenylene ether resin. These patents merely exemplify asbestos as one member of the reinforcing material, and do not disclose nor suggest the characteristics of molding materials containing asbestos.

It is an object of this invention therefore to provide a polyphenylene ether resin composition which gives a molded article having improved rigidity and dimensional stability.

The present inventors made various investigations about fiber-reinforced plastic molding materials comprising a polyphenylene ether resin or a resin composition containing it, and finally found molding materials which have higher rigidity and much lower mold shrinkages than conventional molding materials including glass fibers as a reinforcing material. Specifically, the present inventors unexpectedly found that when a molding material is prepared from a polyphenylene ether resin or a resin composition containing it and asbestos fibers incorporated as a fibrous reinforcing material, the mold shrinkage of the molding material is very much reduced, and the accuracy of molding is high, and moreover, high rigidity is imparted to the resulting molded products.

The extremely low mold shrinkage means low coefficients of linear expansion, and therefore, not only the dimensional accuracy during molding but also the dimensional stability of the molded product increases. In addition to these properties, the molded products obtained from the composition of this invention have a great possibility of becoming substitutes for metal die cast products because of their high heat resistance and high rigidity.

Accordingly, the present invention can provide molding materials which are applicable to a wide range of molding methods such as compression molding and extrusion molding as well as injection molding.

The fiber-reinforced resin composition of the present invention consists essentially of (a) a polyphenylene ether resin or a mixture of a polyphenylene ether resin and a polystyrene resin, and (b) asbestos fibers, and optionally (c) a phosphoric acid ester.

The inclusion of the phosphate imparts a plasticizing effect and a fire-retarding effect to the resin composition of this invention. Thus, in practice, the use of the phosphate is preferred.

The present invention is based on the discovery that by using asbestos fibers as a reinforcing material, better properties than in the case of using glass fibers are provided. The asbestos fibers, as used herein, denote inorganic fibrous materials resulting from the conversion of hornblende or chrysotile into a fine fibrous form. Particularly, short asbestos fibers of good quality obtained from chrysotile are preferred.

Desirably, the asbestos fibers used in this invention are molded into a pellet form. Fine powdery acicular asbestos fibers which are generally known are unsuitable. When such powdery asbestos fibers are mixed with a polyphenylene ether resin or a mixture of it with a styrene resin prior to feeding into a molding machine, the orientation of the asbestos fibers becomes random, and the volume of the mixture increases tremendously. As a result, the mixture tends to block up the exit opening of a hopper for introduction of the mixture into an extruder or the feed opening of the extruder during the extruding, and troubles are liable to be caused during the compounding operation. However, such troubles do not occur, and the compounding operation is very easy in the present invention in which pelletized asbestos fibers are used.

The chrysotile asbestos are commercially available in pellet form under the tradename "Calidria Asbestos" (Union Carbide Corporation, U.S.A.), for example.

The pellets usually have a diameter of 1 to 6 mm, and a length of 5 to 15 mm, preferably a diameter of 2 to 4 mm and a length of 5 to 6 mm.

The amount of the asbestos fibers to be incorporated may be determined as desired according to the final use of the resin composition of this invention. Usually, it is within the range of 10 to 100 parts by weight, preferably 15 to 50 parts by weight, per 100 parts by weight of the resin component (a).

The polyphenylene ether resin used in the fiber-reinforced composition of this invention is a generic term for polymers having a structural unit of the following general formula

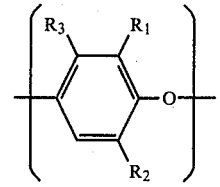

wherein
$R_1$ and $R_2$ represent a lower alkyl group and
$R_3$ represents a hydrogen atom or a lower alkyl group, in the skeleton. It may be a homopolymer composed of only one structural unit of the above formula, or a copolymer composed of two or more of the structural units of the above formula. It is necessary that the degree of polymerization of the resin, as the number of structural units bonded, should be at least 80.

Examples of the polyphenylene ether resin are homopolymers such as poly(2,6-dimethyl-1,4-phenylene)ether and poly(2-methyl-6-ethyl-1,4-phenylene)ether; and copolymers such as a 2,6-dimethylphenol/2,3,6-trimethylphenol random copolymer and a 2-methyl-6-ethylphenol/2,3,6-trimethylphenol random copolymer. From the standpoint of properties and/or versatility, poly(2,6-dimethyl-1,4-phenylene)ether and the 2,6-dimethylphenol/2,3,6-trimethylphenol random copolymer are preferred. In the aforesaid copolymer, the proportion of the 2,6-dimethylphenol in the monomeric mixture is 50 to 98 mole%. Especially preferred is a random copolymer of 2,6-dimethylphenol/2,3,6-trimethylphenol in a molar ratio of 95/5.

The styrene resin used in combination with the polyphenylene ether resin denotes a polymer which contains at least 25% of a structural unit derived from styrene or its derivative (to be referred to as a styrene). Examples are homopolymer of styrene, a copolymer of a styrene and a conjugated diene monomer, a terpolymer of a styrene/conjugated diene monomer/acrylonitrile, and resins generically called rubber-modified high impact polystyrene. The styrene resin may be any styrene polymer which is known to be capable of being incorporated in the polyphenylene ether resin as disclosed in U.S. Pat. Nos. 3,383,435 and 4,038,343. Rubber-modified high impact polystyrene and a styrene homopolymer are especially suitable preferred styrene resins. The ratio of the styrene resin to the polyphenylene ether resin is not particularly critical. However, the desirable amount of the polyphenylene ether resin should be at least 30% by weight of the sum of the polyphenylene ether resin and the styrene resin in order not to impair the inherent properties of the polyphenylene ether resin.

If desired, the fiber-reinforced resin composition of this invention may contain a phosphoric acid ester. The phosphate used is expressed by the general formula

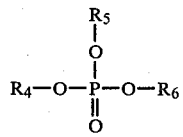

wherein $R_4$, $R_5$ and $R_6$ are identical or different, and each represents an alkyl, aryl or alkyl-substituted aryl group.

Specific examples of the phosphate include triphenyl phosphate, cresyldiphenyl phosphate, triisopropylphenyl phosphate, isooctyldiphenyl phosphate, tri-n-hexyl phosphate, and dibutylphenyl phosphate. Triphenyl phosphate and triisopropylphenyl phosphate corresponding to the above formula in which $R_4$, $R_5$ and $R_6$ represent aryl groups are preferred.

The amount of the phosphate is optionally determined according to the proportions of the resin components. Usually, it is within the range of 2 to 30 parts by weight, preferably 5 to 20 parts by weight, per 100 parts by weight of the resin component (a).

If required, the fiber-reinforced resin composition of this invention may further include various additives such as stabilizers, dyes, pigments, fillers, or mold releasing agents such as olefin waxes and metal salts of aliphatic acids, or a rubber ingredient which will impart impact resistance.

The fiber-reinforced resin composition which is obtained by blending the aforesaid ingredients has better properties than conventional reinforced plastic compositions including glass fibers or a filler such as silica, diatomaceous earth and talc, and is especially suitable as a molding material having a very low mold shrinkage.

The following Examples illustrate the present invention more specifically. All parts and percentages in these examples are by weight.

The various properties of the molded products described in these examples were tested by the methods tabulated below.

| Properties | Testing methods |
|---|---|
| Heat distortion temperature | ASTM D-648 |
| Tensile strength | ASTM D-638 |
| Flexural strength and modulus | ASTM D-790 |
| Mold shrinkage | ASTM D-955 |

EXAMPLE 1

Eighty parts of poly(2,6-dimethyl-1,4-phenylene)ether having an intrinsic viscosity, measured in chloroform at 25° C., of 0.45 dl/gr, 20 parts of Calidria Asbestos RG-600 in a pellet form having a diameter of about 3 mm and a length of about 6 mm (trademark for asbestos fibers made by Union Carbide Corporation) which asbestos fibers had a true specific gravity of 2.36, a magnetite content of 0.7%, a diameter of about 0.025 microns, and an average length of about 5 microns, and 2 parts of triphenyl phosphate were thoroughly mixed in a V blender. The mixture was melted at 300° C., kneaded, and extruded using a twin-screw extruder. The strand was cooled, and pelletized by a pelletizer. The pellets obtained were injection-molded into test pieces at 320° C., and the physical properties of the molded product were evaluated. The results are shown in Table 1. The table also shows the results which were obtained when the same amount of glass fibers ("Glasron CSO3MA497", a product of Asahi Fiber Glass Company) were used instead of the asbestos fibers.

TABLE 1

| Properties | Example 1 | Comparison |
|---|---|---|
| Heat distortion temperature (°C.) (load 264 p.s.i.) | 195 | 187 |
| Tensile strength (kg/cm²) | 1060 | 890 |
| Flexural strength (kg/cm²) | 1500 | 1350 |
| Mold shrinkage (mm/mm) | 0.0016 | 0.0043 |

EXAMPLE 2

A composition consisting of 70 parts of a phenylene ether copolymer (a random copolymer of 95 mole% of 2,6-dimethylphenol and 5 mole% of 2,3,6-trimethylphenol on the basis of the monomers) having an intrinsic viscosity measured in chloroform at 25° C., of 0.45 dl/gr, 30 parts of the same asbestos fibers as used in Example 1, and 7 parts of triphenyl phosphate was pelletized by the same method as described in Example 1, and molded in the same way as in Example 1. The properties of the molded product were determined, and the results are shown in Table 2.

For comparison, the above procedure was repeated except that the same amount of glass fibers were used instead of the asbestos fibers. The results are also shown in Table 2.

TABLE 2

|  | Example 2 | Comparison |
| --- | --- | --- |
| Heat distortion temperature (°C.) (load 264 p.s.i.) | 173 | 168 |
| Tensile strength (kg/cm$^2$) | 1240 | 950 |
| Flexural strength (kg/cm$^2$) | 1770 | 1430 |
| Flexural modulus (kg/cm$^2$) | 92200 | 66200 |
| Mold shrinkage (mm/mm) | 0.0006 | 0.0020 |

EXAMPLE 3

Seventy parts of the same methylene ether copolymer as used in Example 2, 30 parts of rubber-modified high impact polystyrene (rubber content 6%; intrinsic viscosity 0.83 dl/gr measured in chloroform at 25° C.), 43.5 parts of the same asbestos fibers as used in Example 2, 13 parts of triphenyl phosphate, 1 part of titanium oxide and 0.5 part of a stabilizer, containing 3,5-di-tertiary butyl-4-hydroxy toluene and hydrogenated bisphenol A phosphite ester resin, were mixed in a Henschel mixer. The mixture was melted at 290° C., kneaded and extruded by a twin-screw extruder to afford a pelletized composition in a customary manner. The pelletized composition was injection-molded at 280° C. to form test pieces. The properties of the test pieces were evaluated, and the results are shown in Table 3.

TABLE 3

| Heat distortion temperature (load 264 p.s.i.) | 125° C. |
| --- | --- |
| Tensile strength | 1035 kg/cm$^2$ |
| Flexural strength | 1500 kg/cm$^2$ |
| Flexural modulus | 84300 kg/cm$^2$ |
| Mold shrinkage | 0.0006 mm/mm |

EXAMPLES 4 TO 6

The same poly(2,6-dimethyl-1,4-phenylene)ether as used in Example 1, polystyrene having an intrinsic viscosity, measured in chloroform at 25° C., of 0.95 dl/gr, and the same asbestos fibers as used in Example 1 were blended in the proportions shown in Table 4 to form compositions. Each of the compositions was pelletized in the same way as in Example 1, and the properties of the resulting test pieces were measured. The results are in Table 4.

TABLE 4

|  | Example 4 | Example 5 | Example 6 |
| --- | --- | --- | --- |
| Composition (parts) | | | |
| Polyphenylene ether | 35 | 50 | 75 |
| Polystyrene | 65 | 50 | 25 |
| Asbestos fibers | 43.5 | 43.5 | 43.5 |
| Properties | | | |
| Heat distortion temperature (°C.; load 264 p.s.i.) | 135 | 148 | 175 |
| Tensile strength (kg/cm$^2$) | 1200 | 1250 | 1220 |
| Flexural strength (kg/cm$^2$) | 1650 | 1720 | 1700 |
| Mold shrinkage (mm/mm) | 0.0006 | 0.0006 | 0.0006 |

EXAMPLE 7

A composition composed of 70 parts of poly(2,6-dimethyl-1,4-phenylene) having an intrinsic viscosity, measured in chloroform at 25° C., of 0.50 dl/gr, 30 parts of asbestos fibers having a specific gravity of 2.45, a magnetite content of 0.6%, a diameter of about 0.025 micron and an average length of about 5 microns ("Calidria Asbestos RG-144", a trademark for a product of Union Carbide Corporation, which was in a pellet form having a diameter of about 3 mm and a length of about 6 mm), and 7 parts of triphenyl phosphate was produced in the same way as in Example 1. The composition was molded in the same way as in Example 1, and tested. The results are shown in Table 5.

TABLE 5

| Heat distortion temperature | 178° C. |
| --- | --- |
| Tensile strength | 1010 kg/cm$^2$ |
| Flexural strength | 1470 kg/cm$^2$ |
| Mold shrinkage | 0.0006 mm/mm |

EXAMPLE 8

A composition consisting of 80 parts of a phenylene ether copolymer (a random copolymer of 95 mole% of 2,6-dimethylphenol and 5 mole% of 2,3,6-trimethylphenol on the basis of the monomers) having an intrinsic viscosity, measured in chloroform at 25° C., of 0.48 dl/gr, 20 parts of the same asbestos fibers as used in Example 1, 1 part of a polyethylene wax having a molecular weight of about 9000, 0.5 part of 2,2'-methylene bis(4-methyl-6-tert-butylphenol), and 7 parts of triphenylphosphate was pelletized by the same method as in Example 1. The properties of the molded product were determined, and the results are shown in Table 6.

TABLE 6

| Heat distortion temperature | 182° C. |
| --- | --- |
| Tensile strength | 1000 kg/cm$^2$ |
| Flexural strength | 1460 kg/cm$^2$ |
| Mold shrinkage | 0.0012 mm/mm |

What we claim is:

1. A fiber-reinforced resin composition having improved rigidity and dimensional stability, said composition consisting essentially of (a) a resin component which contains at least 30% by weight of a polyphenylene ether resin and, the balance being a styrene resin and (b) chrysotile asbestos fibers which are used in the form of pellets and in the amount of 10 to 100 parts by weight per 100 parts by weight of said resin component.

2. The composition of claim 1 which further contains a phosphoric acid ester.

3. The composition of claim 2 wherein the amount of the phosphoric acid ester is 2 to 30 parts by weight per 100 parts by weight of the resin component (a).

* * * * *